United States Patent
Karczewicz et al.

(10) Patent No.: US 6,920,175 B2
(45) Date of Patent: *Jul. 19, 2005

(54) VIDEO CODING ARCHITECTURE AND METHODS FOR USING SAME

(75) Inventors: Marta Karczewicz, Irving, TX (US); Ragip Kurceren, Irving, TX (US)

(73) Assignee: Nokia Corporation, Espoo (FI)

( * ) Notice: Subject to any disclaimer, the term of this patent is extended or adjusted under 35 U.S.C. 154(b) by 712 days.

This patent is subject to a terminal disclaimer.

(21) Appl. No.: 09/925,769

(22) Filed: Aug. 9, 2001

(65) Prior Publication Data

US 2002/0118755 A1 Aug. 29, 2002

Related U.S. Application Data

(63) Continuation-in-part of application No. 09/883,887, filed on Jun. 18, 2001, now Pat. No. 6,765,963, which is a continuation-in-part of application No. 09/827,796, filed on Apr. 6, 2001, now abandoned.
(60) Provisional application No. 60/259,529, filed on Jan. 3, 2001.

(51) Int. Cl.⁷ .............................................. H04N 7/18
(52) U.S. Cl. ............................. 375/240.03; 375/240.04
(58) Field of Search ........................ 375/240.11, 240.29

(56) References Cited

U.S. PATENT DOCUMENTS

| | | | | |
|---|---|---|---|---|
| 6,160,844 A | * | 12/2000 | Wilkinson | 375/240 |
| 6,393,055 B1 | * | 5/2002 | Martin | 375/240 |
| 6,393,057 B1 | * | 5/2002 | Thoreau et al. | 375/240 |
| 6,434,195 B1 | * | 8/2002 | Luthra et al. | 375/240.12 |
| 6,529,555 B1 | * | 3/2003 | Saunders et al. | 375/240.26 |
| 6,618,438 B1 | * | 9/2003 | Le Roux et al. | 375/240.12 |
| 6,765,963 B2 | * | 7/2004 | Karczewicz et al. | 375/240.03 |

* cited by examiner

*Primary Examiner*—Andy Rao
(74) *Attorney, Agent, or Firm*—Steven A. Shaw

(57) ABSTRACT

A decoder and method for using a new picture or frame type is provided. This type is referred to a an SP-picture. The temporal redundancies are not exploited in I-frames, compression efficiency of I-frame coding is significantly lower than the predictive coding. A method in accordance with an embodiment of the invention allows use of motion compensated predictive coding to exploit temporal redundancy in the sequence while still allowing identical reconstruction of the frame using different reference frames. Methods in accordance with embodiments of the invention using this new picture type provide for error resilience/recovery, bandwidth scalability, bitstream switching, processing scalability, random access and other functions.

The SP-type picture provides for, among other functions, switching between different bitstreams, random access, fast forward and fast error-recovery by replacing I-pictures to increase the coding efficiency. SP-pictures have the property that identical SP-frames may be obtained even when they are predicted using different reference frames.

13 Claims, 6 Drawing Sheets

VIDEO CODING ARCHITECTURE AND METHODS FOR USING SAME

CROSS REFERENCE TO RELATED APPLICATIONS

This application is a continuation-in-part of U.S. patent application Ser. No. 09/883,887 filed Jun. 18, 2001, now U.S. Pat. No. 6,765,963 issued on Jul. 20, 2004, which is a continuation-in-part of U.S. patent application Ser. No. 09/827,796 filed on Apr. 6, 2001, now abandoned entitled VIDEO DECODER ARCHITECTURE AND METHOD FOR USING SAME and claims priority from Provisional Application No. 60/259,529 filed on Jan. 3, 2001. All incorporated herein by reference.

BACKGROUND

This invention relates generally to the field of the multimedia applications. More particularly, this invention relates to a encoder/compressor, decoder/decompressor, a new frame type and method for encoding/decoding video sequences and providing access to a video stream.

Multimedia applications that include audio and video information have come into greater use. Several multimedia groups have established and proposed standards for compressing/encoding and decompressing/decoding the audio and video information. The examples are MPEG standards, established by the Motion Picture Expert Group and standards developed by ITU-Telecommunications Standardization.

The following are incorporated herein by reference:
G. Bjontegaard, "H.26L Test Model Long Term Number 6 (TML-6) draft0", document VCEG-L45, ITU-T Video Coding Experts Group Meeting, Eibsee, Germany, 09–12 Jan. 2001. Keiichi Hibi, "Report of the Ad Hoc Committee on H.26L Development", document Q15-H-07, ITU-T Video Coding Experts Group (Question 15) Meeting, Berlin, 03–06 Aug., 1999. Gary S. Greenbaum, "Remarks on the H.26L Project: Streaming Video Requirements for Next Generation Video Compression Standards", document Q15-G-11, ITU-T Video Coding Experts Group (Question 15) Meeting, Monterey, 16–19 Feb., 1999. G. Bjontegaard, "Recommended Simulation Conditions for H.26L", document Q15-1-62, ITU-T Video Coding Experts Group (Question 15) Meeting, Red Bank, N.J., 19–22 Oct., 1999. ATM & MPEG-2 Integrating Digital Video into Broadband Networks by Michael Orzessek and Peter Sommer (Prentice Hall Upper Saddle River New Jersey).

Video sequences comprise a sequence of still images, and the illusion of motion is created by displaying consecutive images in sequence at a relatively fast rate. Typically, the display rate is between five and thirty frames per second. A typical scene recorded by a camera comprises stationary elements and moving elements. An example of stationary elements is background scenery. The moving elements may take many different forms, for example, the face of a news reader, moving traffic, and so on. Alternatively, the camera recording the scene may itself be moving, in which case all elements of the image have the same kind of motion. In such cases, this means that the change between one video frame and the next one is rather small, i.e., the consecutive frames tend to be similar. This similarity is referred to as the correlation between frames or temporal redundancy. Likewise, in typical video sequences, neighboring regions/pixels within a frame exhibit strong similarities. This type of similarity is referred to as the spatial redundancy or spatial correlation. The redundancy in video sequences can then be categorized into spatial and temporal redundancy. The purpose of the video coding is to remove the redundancy in the video sequence.

In the existing video coding standards, there are three types of video frame encoding algorithms; classified based on the type of redundancy exploited, temporal or spatial. Intra-frame or I-type frame, depicted in FIG. 1A, 200 is a frame of video data that is coded exploiting only the spatial correlation of the pixels within the frame without using any information from the past or the future frames. I-frames are utilized as the basis for decoding/decompression of other frames. FIG. 1B depicts Predictive-frame or P-type frame 210. The P-type frame or picture is a frame that is encoded/compressed using prediction from I-type or P-type frames of its past, in this case, $I_1$ 200. 205a represents the motion compensated prediction information to create a P-type frame 210. Since in a typical video sequence the adjacent frames in a sequence are highly correlated, higher compression efficiencies are achieved when using P-frames instead of I-frames. On the other hand, P-frames can not be decoded independently without the previous frames.

FIG. 1C depicts a Bi-directional-frame or B-type frame 220. The B-type frame or picture is a frame that is encoded/compressed using a prediction derived from the I-type reference frame (200 in this example) or P-type reference frame in its past and the I-type reference frame or P-type reference frame (210 in this example) in its future or a combination of both. FIG. 2 represents a group of pictures in what is called display order $I_1$ $B_2$ $B_3$ $P_4$ $B_5$ $P_6$. FIG. 2 illustrates the B-type frames inserted between I-type and P-type frames and the direction which motion compensation information flows.

Referring to FIGS. 3 and 4, a communication system comprising an encoder 300 of FIG. 3 and a decoder 400 of FIG. 4 is operable to communicate a multimedia sequence between a sequence generator and a sequence receiver. Other elements of the video sequence generator and receiver are not shown for the purposes of simplicity. The communication path between sequence generator and receiver may take various forms, including but not limited to a radio-link.

Encoder 300 is shown in FIG. 3 coupled to receive video input on line 301 in the form of a frame to be encoded, called the current frame, I(x,y). By (x,y) we denote location of the pixel within the frame. In the encoder the current frame I(x,y) is partitioned into rectangular regions of M×N pixels. These blocks are encoded using either only spatial correlation (intra coded blocks) or both spatial and temporal correlation (inter coded blocks). In what follows we concentrate on inter blocks.

Each of inter coded blocks is predicted using motion information from the previously coded and transmitted frame, called reference frame and denoted as R(x,y), which is available in the frame memory 350 of the encoder 300. The motion information of the block may be represented by two dimensional motion vector ($\Delta x(x,y)$, $\Delta y(x,y)$) where $\Delta x(x,y)$ is the horizontal and $\Delta y(x,y)$ is the vertical displacement, respectively, of the pixel in location (x,y) between the current frame and the reference frame. The motion vectors ($\Delta x(\ )$, $\Delta y(\ )$) are calculated by the motion estimation and coding block 370. The input to the motion estimation and coding block 370 are current frame and reference frame. The motion estimation and coding block finds the best matching block, according to a certain criteria, from the reference frame to the current block. The motion information is provided to a Motion Compensated (MC) prediction block 360. The MC prediction block is also coupled to a frame memory 350 to receive the reference frame. In the MC block 360, prediction frame P(x,y) is constructed with the use of the motion vectors for each inter block together with the reference frame by, $$P(x,y)=R(x+\Delta x(x,y), y+\Delta y(x,y)).$$

Notice that the values of the prediction frame for inter blocks are calculated from the previously decoded frame. This type of prediction is refered as motion compensated prediction. It is also possible to use more than one reference frame. In such a case, different blocks of the current frame may use different reference frames. For pixels (x,y) which belong to intra blocks, prediction blocks are either calculated from the neighboring regions within the same frame or are simply set to zero.

Subsequently, the prediction error E(x,y) is defined as the difference between the current frame and the prediction frame P(x,y) and is given by:

$$E(x,y)=I(x,y)-P(x,y).$$

In transform block 310, each K×L block in the prediction error E(x,y) is represented as weighted sum of a transform basis functions $f_{ij}(x,y)$, $$E(x,y) = \sum_{i=1}^{K}\sum_{j=1}^{L} c_{err}(i,j) f_{ij}(x,y).$$

The weights $c_{err}(i,j)$, corresponding to the basis functions are called prediction error coefficients. Coefficients $c_{err}(i,j)$ can be calculated by performing so called forward transform. These coefficients are quantized in quantization block 320:

$$I_{err}(i,j)=Q(c_{err}(i,j),QP)$$

where $I_{err}(i,j)$ are the quantized coefficients and QP is the quantization parameter. The quantization introduces loss of information while the quantized coefficient can be represented with smaller number of bits. The level of compression (loss of information) is controlled by adjusting the value of the quantization parameter (QP).

The special type of the inter coded blocks are copy coded blocks. For copy coded blocks, values of both motion vectors and quantized prediction error coefficients $I_{err}$ are equal to 0.

Motion vectors and quantized coefficients are usually encoded using an entropy coder, for example, Variable Length Codes (VLC). The purpose of entropy coding is to reduce the number of bits needed for their representation. Certain values of motion vectors and quantized coefficients are more likely than other values. And entropy coding techniques assign less number of bits to represent more likely values than for those that are less likely to occur. Entropy encoded motion vectors and quantized coefficients as well as other additional information needed to represent each coded frame of the image sequence is multiplexed at a multiplexer 380 and the output constitutes a bitstream 415 which is transmitted to the decoder 400 of FIG. 4.

For color pictures, color information must be provided for every pixel of an image. Typically, color information is coded in terms of the primary color components red, green and blue (RGB) or using a related luminance/chrominance model, known as the YUV model. This means that there are three components to be encoded, for example for YUV model one luminance and two color difference components, YCbCr. The encoding of luma components is performed as described above. The encoding of chroma is similar to that of luma using the same coding blocks as described above but certain values calculated while encoding luma components are used during encoding of chroma components, for example, motion vectors obtained from luma components are reused for encoding of chroma components.

The rest of the blocks in encoder 300 represent the decoder loop of the encoder. Decoder loop reconstructs the frames from the calculated values just as the same way as the decoder 400 does from 415. Therefore encoder, at all times, will have the same reconstructed frames as the ones on the decoder side. Following provides a list of these blocks and a detailed description of these blocks will follow when decoder 400 is described. The quantization block 320 is coupled to both a multiplexer 380 and an inverse quantization block 330 and in turn an inverse transform block 340. Blocks 330 and 340 provide decoded prediction error $E_c(x,y)$ which is added to the MC predicted frame P(x,y) by adder 345. These values can be further normalized and filtered. The resulting frame is called the reconstructed frame and is stored in frame memory 350 to be used as reference for the prediction of future frames.

FIG. 4 shows the decoder 400 of the communication system. Bitstream 415 is received from encoder 300 of FIG. 3. Bitstream 415 is demultiplexed via demultiplexer 410. Dequantized coefficients $d_{err}(i,j)$ are calculated in the inverse quantization block 420:

$$d_{err}(i,j)=Q^{-1}(I_{err}(i,j), QP).$$

Inverse transform is performed on the dequantized coefficients to reconstruct the prediction error in inverse transform block 430:

$$E_c(x,y) = \sum_{i=1}^{K}\sum_{j=1}^{L} d_{err}(i,j) f_{ij}(x,y).$$

The prediction block P(x,y) for the current block is calculated by using the received motion vectors and the previously decoded reference frame(s). The pixel values of the current frame are then reconstructed by adding prediction P(x,y) to the prediction error $E_c(x,y)$ in adder 435:

$$I_c(x,y)=R(x+\Delta x, y+\Delta y)+E_c(x,y).$$

These values can be further normalized and filtered to obtain the reconstructed frame. The reconstructed frame is stored in frame memory 440 to be used as reference frame for future frames.

An example of a forward transform is provided by "H.26L Test Model Long Term Number 6 (TML-6) draft0", document VCEG-L45, ITU-T Video Coding Experts Group Meeting, Eibsee, Germany, 09–12 Jan. 2001. The forward transformation of some pixels a, b, c, d into 4 transform coefficients A, B, C, D is defined by:

$$A=13a+13b+13c+13d$$

$$B=17a+7b-7c-17d$$

$$C=13a-13b-13c+13d$$

$$D=7a-17b+17c-7d$$

The inverse transformation of transform coefficients A, B, C, D into 4 pixels a', b', c', d' is defined by:

$$a'=13A+17B+13C+7D$$

$$b'=13A+7B-13C-17D$$

$$c' = 13A - 7B - 13C + 17D$$

$$d' = 13A - 17B + 13C - 7D$$

The transform/inverse transform is performed for 4×4 blocks by performing defined above one dimensional transform/inverse transform both vertically and horizontally.

In "H.26L Test Model Long Term Number 6 (TML-6) draft0", document VCEG-L45, ITU-T Video Coding Experts Group Meeting, Eibsee, Germany, 09–12 Jan. 2001, for chroma component, an additional 2×2 transform for the DC coefficients is performed as follows: chroma components are partitioned into 8×8 blocks called macroblocks and after 4×4 transform of each of the four blocks in 8×8 macroblock, DC coefficients, i.e., (0,0) coefficients, of the blocks are rearranged and are labeled as DC0, DC1, DC2, and DC3, and an additional transformation is performed on these DC coefficients by, $$DCC(0,0) = (DC0 + DC1 + DC2 + DC3)/2$$

$$DCC(1,0) = (DC0 - DC1 + DC2 - DC3)/2$$

$$DCC(0,1) = (DC0 + DC1 - DC2 - DC3)/2$$

$$DCC(1,1) = (DC0 - DC1 - DC2 + DC3)/2$$

Definition of the corresponding inverse transform:

$$DC0 = (DCC(0,0) + DCC(1,0) + DCC(0,1) + DCC(1,1))/2$$

$$DC1 = (DCC(0,0) - DCC(1,0) + DCC(0,1) - DCC(1,1))/2$$

$$DC2 = (DCC(0,0) + DCC(1,0) - DCC(0,1) - DCC(1,1))/2$$

$$DC3 = (DCC(0,0) - DCC(1,0) - DCC(0,1) + DCC(1,1))/2$$

In "H.26L Test Model Long Term Number 6 (TML-6) draft0", document VCEG-L45, ITU-T Video Coding Experts Group Meeting, Eibsee, Germany, 09–12 Jan. 2001 to obtain values of reconstructed image the results of the inverse transform are normalized by shifting by 20 bits (with rounding).

An example of quantization/dequantization is provided by "H.26L Test Model Long Term Number 6 (TML-6) draft0", document VCEG-L45, ITU-T Video Coding Experts Group Meeting, Eibsee, Germany, 09–12 Jan. 2001. A coefficient c is quantized in the following way:

$$I = (c \times A(QP) + f \times 2^{20}) // 2^{20}$$

where f may be in the range (−0.5 to +0.5) and f may have the same sign as c. By // division with truncation is denoted. The dequantized coefficient is calculated as follows:

$$d = I \times B(QP)$$

Values of A(QP) and B(QP) are given below:

A(QP=0, . . . , 31)=[620, 553, 492, 439, 391, 348, 310, 276, 246, 219, 195, 174, 155, 138, 123, 110, 98, 87, 78, 69, 62, 55, 49, 44, 39, 35, 31, 27, 24, 22, 19, 17];

B(QP=0, . . . , 31)=[3881, 4351, 4890, 5481, 6154, 6914, 7761, 8718, 9781, 10987, 12339, 13828, 15523, 17435, 19561, 21873, 24552, 27656, 30847, 34870, 38807, 43747, 49103, 54683, 61694, 68745, 77615, 89113, 100253, 109366, 126635, 141533];

Video streaming has emerged as one of the essential applications over the fixed internet and in the near future over 3G multimedia networks. In streaming applications, the server starts streaming the pre-encoded video bitstream to the receiver upon a request from the receiver which plays the stream as it receives with a small delay. The best-effort nature of today's networks causes variations of the effective bandwidth available to a user due to the changing network conditions. The server should then scale the bitrate of the compressed video to accommodate these variations. In case of conversational services that are characterized by real-time encoding and point-to-point delivery, this is achieved by adjusting, on the fly, the source encoding parameters, such as quantization parameter or frame rate, based on the network feedback. In typical streaming scenarios when already encoded video bitstream is to be streamed to the client, the above solution can not be applied.

The simplest way of achieving bandwidth scalability in case of pre-encoded sequences is by producing multiple and independent streams of different bandwidth and quality. The server then dynamically switches between the streams to accommodate variations of the bandwidth available to the client.

Now assume that we have multiple bitstreams generated independently with different encoding parameters, such as quantization parameter, corresponding to the same video sequence. Since encoding parameters are different for each bitstream, the reconstructed frames of different bitstreams at the same time instant will not be the same. Therefore when switching between bitstreams, i.e., starting to decode a bitstream, at arbitrary locations would lead to visual artifacts due to the mismatch between the reference frames used to obtain predicted frame. Furthermore, the visual artifacts will not only be confined to the switched frame but will further propagate in time due to motion compensated coding.

In the current video encoding standards, perfect (mismatch-free) switching between bitstreams is achieved possible only at the positions where the future frames/regions do not use any information previous to the current switching location, i.e., at I-frames. Furthermore, by placing I-frames at fixed (e.g. 1 sec) intervals, VCR functionalities, such as random access or "Fast Forward" and "Fast Backward" (increased playback rate) for streaming video content, are achieved. User may skip a portion of video and restart playing at any I-frame location. Similarly, increased playback rate can be achieved by transmitting only I-pictures. The drawback of using I-frames in these applications is that since I-frames do not utilize temporal redundancy they require much larger number of bits than P-frames.

The above-mentioned references are exemplary only and are not meant to be limiting in respect to the resources and/or technologies available to those skilled in the art.

SUMMARY

A new picture or frame type and method of using same is provided. This type of novel frame type is referred to as an SP-picture. SP-picture uses motion compensated predictive coding to exploit temporal redundancy in the sequence. The difference between SP and P-pictures is that using SP-pictures identical frames may be obtained even when different reference frames are used for prediction. This property allows SP-pictures to replace I-pictures in numerous applications such as switching from one bitstream to another, random access, fast-forward, fast-backward. At the same time since SP-frames unlike I-frames are utilizing motion compensated predictive coding they require smaller number of bits than I-frames.

These and other features, aspects, and advantages of embodiments of the present invention will become apparent with reference to the following description in conjunction with the accompanying drawings. It is to be understood, however, that the drawings are designed solely for the

BRIEF DESCRIPTIONS OF THE DRAWINGS

DETAILED DESCRIPTION

A new decoder architecture is provided which has the property that identical frames may be obtained even when they are predicted using different reference frames. The picture type obtained using this structure will be called SP-frame also may be referred to as picture. This property allows SP-pictures to replace I-pictures in numerous applications such as switching from one bitstream to another, random access, fast-forward, fast-backward. Since unlike I-frames SP-frames are using motion compensated prediction they require a lot less bits than the I-frames.

Figure 1A:
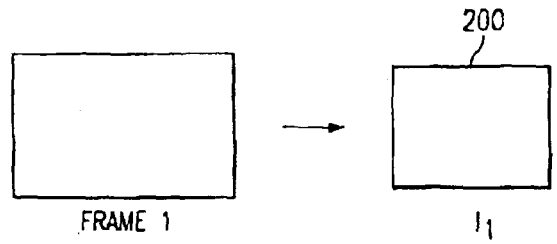
FIG. 1A is a diagram showing the encoding of an I-type frame or I-picture.
Figure 1B:
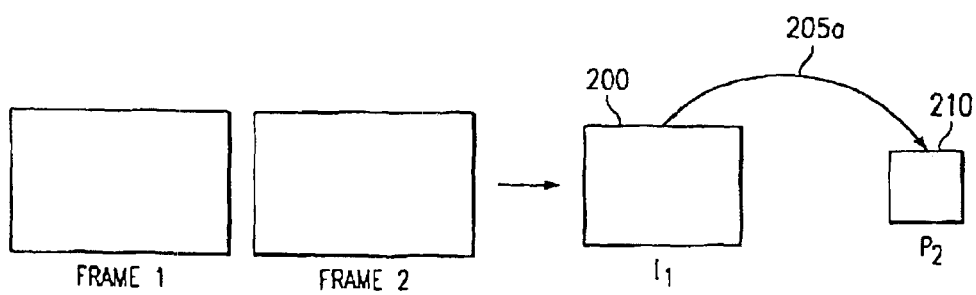
FIG. 1B is a diagram showing the encoding of a P-type frame or P-picture.
Figure 1C:
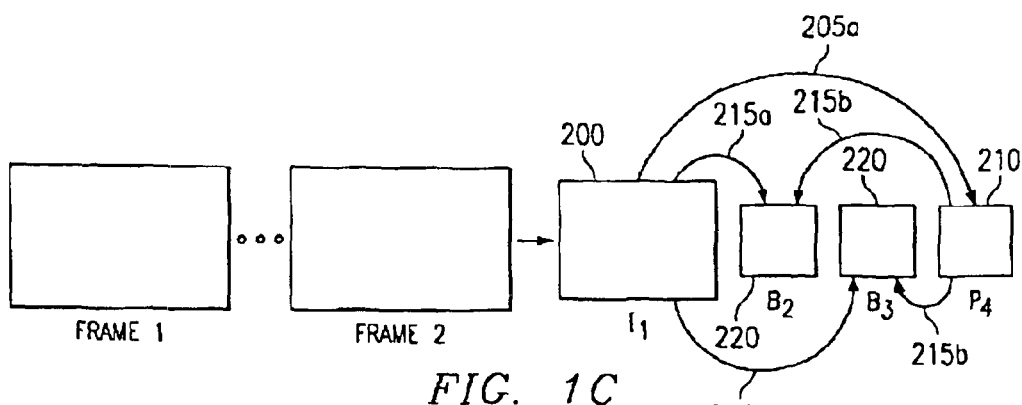
FIG. 1C is a diagram showing the encoding of a B-type frame or B-picture.
Figure 2:
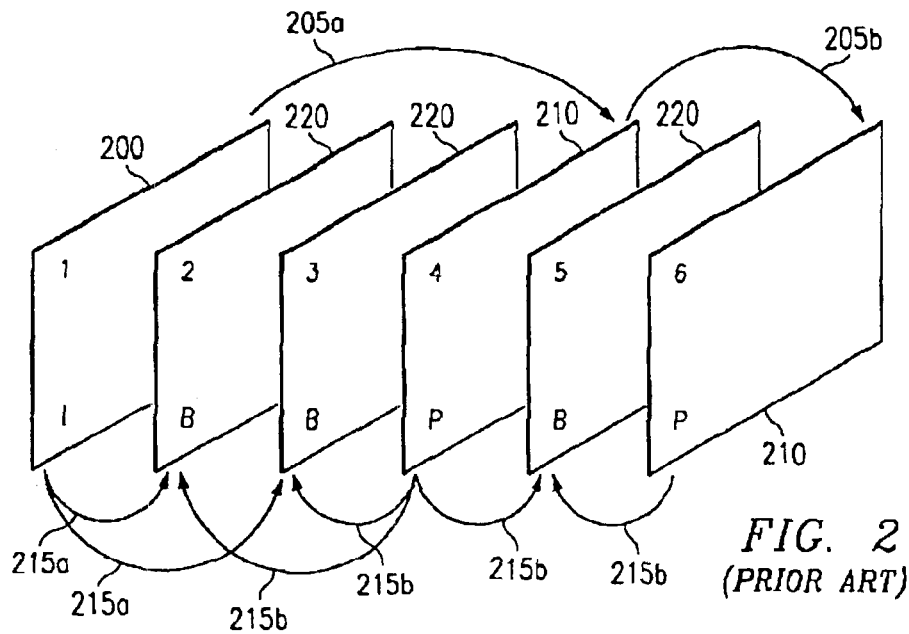
FIG. 2 is a diagram showing B-type frame inserted between I-type and P-type frames and the direction which motion compensation information flows.
Figure 3:
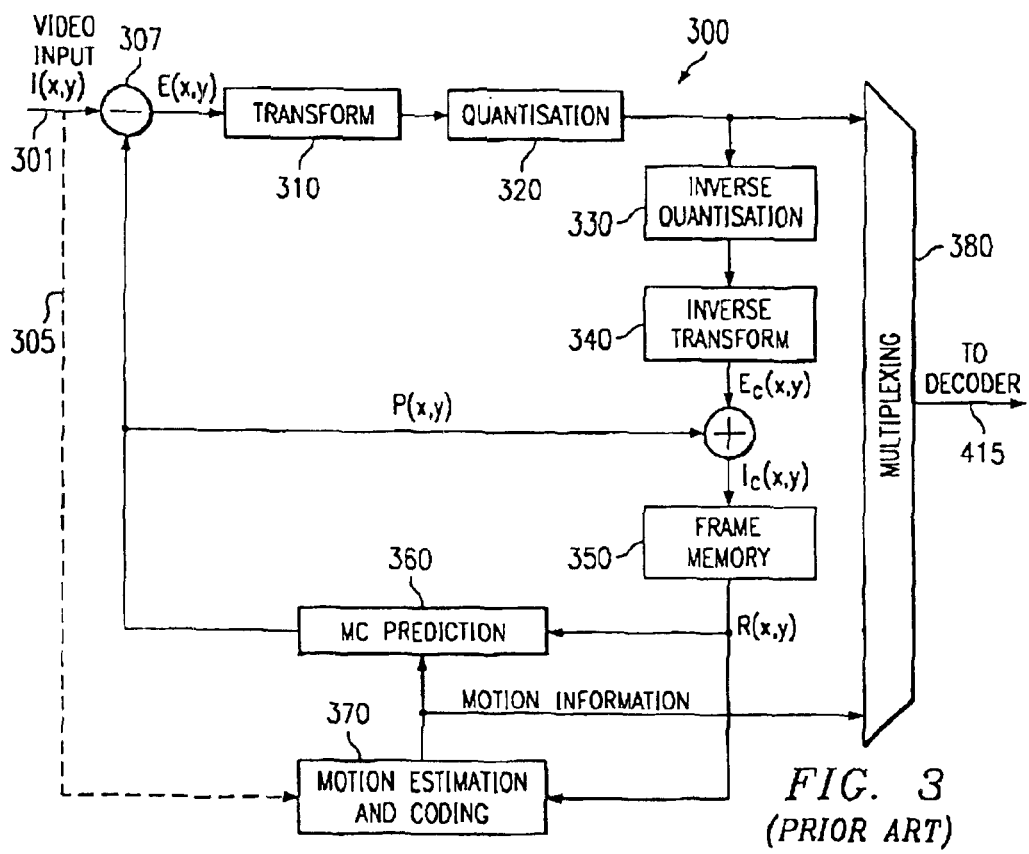
FIG. 3 is a block diagram of a generic motion-compensated predictive video coding system (encoder).
Figure 4:
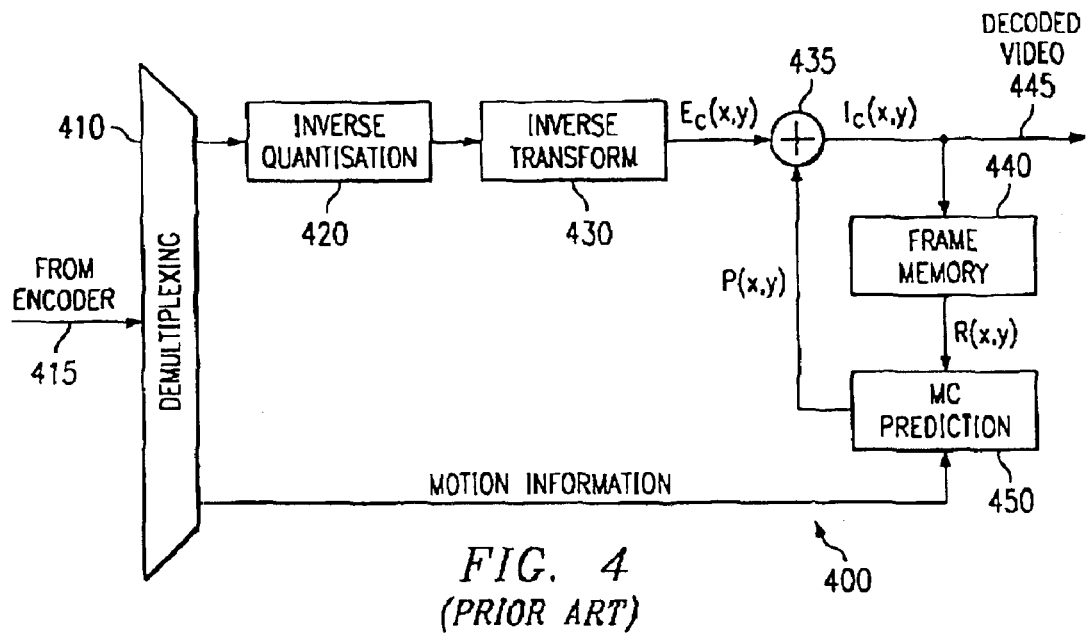
FIG. 4 is a block diagram of a generic motion-compensated predictive video coding system (decoder).
Figure 5:
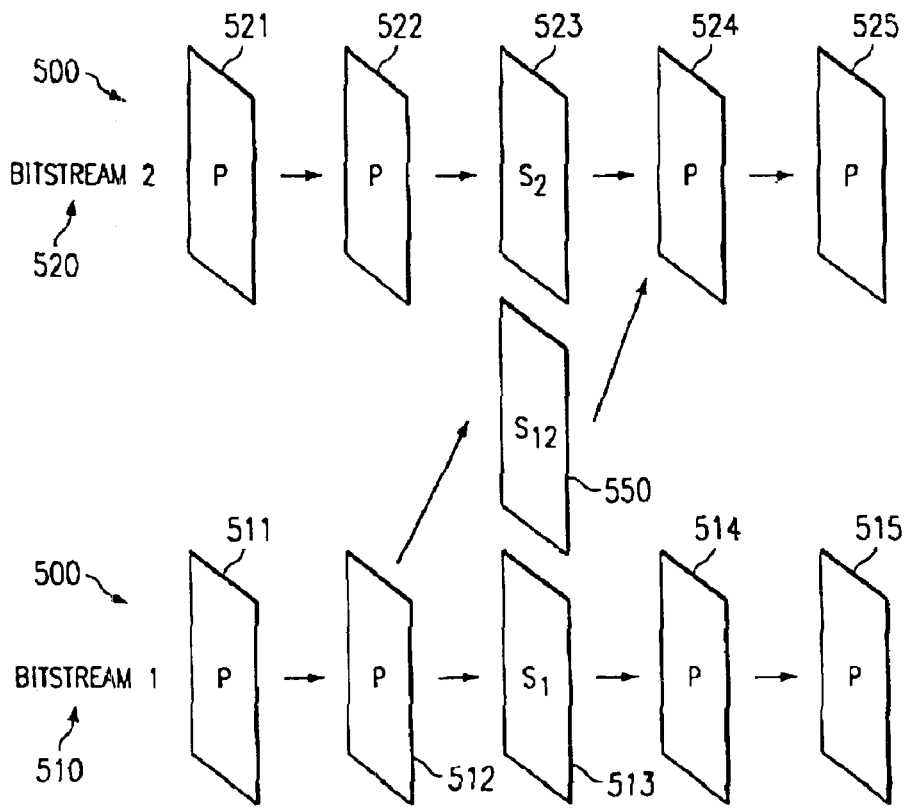
FIG. 5 is an illustration showing switching between bitstreams 1 and 2 using SP-pictures.

Some of possible applications of SP-frames are described below:

Bitstream Switching:

An example of how to utilize SP-frames to switch between different bitstreams is illustrated in the FIG. 5. FIG. 5 shows two bitstreams corresponding to the same sequence encoded at different bitrates—bitstream 1 (510) and bitstream 2 (520). Within each encoded bitstream, SP-pictures should be placed at locations at which one wants to allow switching from one bitstream to another (pictures $S_1$ (513), and $S_2$ (523) in FIG. 5). When switching from bitstream 1 (510) to bitstream 2 (520), another picture of this type will be transmitted (in FIG. 5 picture $S_{12}$ (550) will be transmitted instead of $S_2$ (523)). Although, Pictures $S_2$ (523) and $S_{12}$ (550) in FIG. 5 are represented by different bitstreams, i.e., they are using different reference frames, their reconstructed values are identical.

Figure 7:
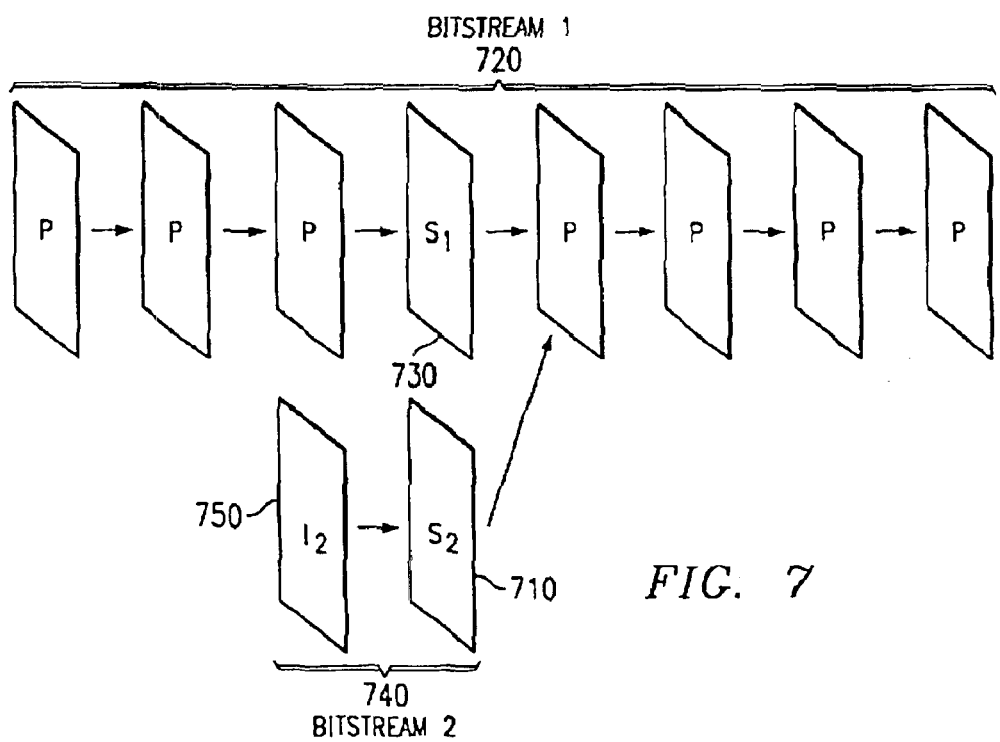
FIG. 7 is an illustration of random access using SP-pictures.
Figure 8:
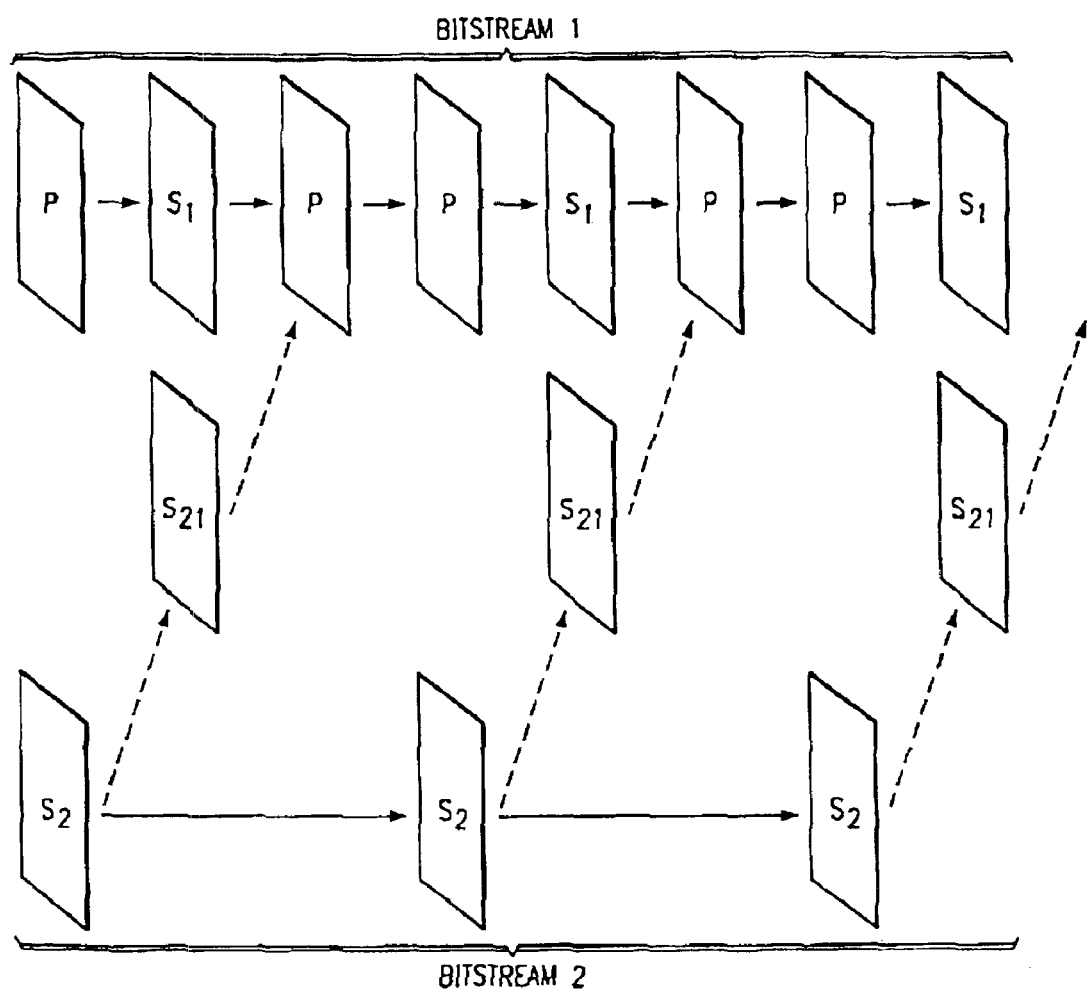
FIG. 8 is an illustration of a fast-forward process using SP-pictures.

Random Access:

Application of SP-pictures to enable random access is depicted in FIG. 7. SP-pictures are placed at fixed intervals within bitstream 1 (720) (e.g. picture $S_1$ (730)) which is being streamed to the client. To each one of these SP-pictures there is a corresponding pair of pictures generated and stored as another bitstream (bitstream 2 (740)):

I-picture, $I_2$ (750), at the temporal location preceding SP-picture.

SP-picture 710, $S_2$, at the same temporal location as SP-picture.

Pictures stored in bitstream 2 (740) are only used when random access is requested by a client. Bitstream 1 (720) may then be accessed at a location corresponding to an I-picture in bitstream 2 (740). For example to access bitstream 1 at frame $I_2$, first the pictures $I_2$, $S_2$ from bitstream 2 are transmitted and then the following pictures from bitstream 1 are transmitted.

Fast-forward:

If in FIG. 7 bitstream 2 will constitute of only SP-pictures predicted from each other placed in larger temporal intervals (e.g. each 1 sec) the structure presented in this figure can be used to obtain "Fast Forward" functionality. Due to the usage of SP-pictures "Fast Forward" can start at any bitstream location. In similar manner "Fast Backward" functionality can be obtained.

Video Redundancy Coding:

SP-pictures have other uses in applications in which they do not act as replacements of I-pictures. Video Redundancy Coding can be given as an example (VRC). "The principle of the VRC method is to divide the sequence of pictures into two or more threads in such a way that all camera pictures are assigned to one of the threads in a round-robin fashion. Each thread is coded independently. In regular intervals, all threads converge into a so-called sync frame. From this sync frame, a new thread series is started. If one of these threads is damaged because of a packet loss, the remaining threads stay intact and can be used to predict the next sync frame. It is possible to continue the decoding of the damaged thread, which leads to slight picture degradation, or to stop its decoding which leads to a drop of the frame rate. Sync frames are always predicted out of one of the undamaged threads. This means that the number of transmitted I-pictures can be kept small, because there is no need for complete re-synchronization." For the sync frame, more than one representation (P-picture) is sent, each one using a reference picture from a different thread. Due to the usage of P-pictures these representations are not identical. Therefore, mismatch is introduced when some of the representations cannot be decoded and their counterparts are used when decoding the following threads. Usage of SP-pictures as sync frames eliminates this problem.

Error Resiliency/Recovery:

Multiple representations of a single frame in the form of SP-frames predicted from different reference pictures, e.g., the immediate previously reconstructed frames and a reconstructed frame further back in time, can be used to increase error resilience. Consider the case when an already encoded bitstream is being streamed and there has been a packet loss leading to a frame loss. The client signals the lost frame(s) to the sender which responds by sending the next SP-frame in the representation that uses frames that have been already received by the client.

SP-Frame Decoding and Encoding:

SP-frame comprises two kinds of blocks, specifically, the blocks encoded using only spatial correlation among the pixels (intra blocks) and the blocks encoded using both spatial and temporal correlation (inter or copy blocks). While intra blocks in SP-frames are encoded/decoded the same way as the intra blocks in P and I-frames, the encoding/decoding of inter and copy coded blocks are different from that of blocks in P-type frames. Therefore, in the following encoding/decoding of inter and copy coded blocks are described.

Value of each pixel S(x,y) in the inter or copy coded block is reconstructed as a weighted sum of the basis functions f.sub.ij(x,y) where the weighting values d.sub.rec will be called dequantized reconstruction image coefficients. The values of d.sub.rec are obtained by quantization and dequantization of reconstruction image coefficients c.sub.rec. Reconstruction image coefficients c.sub.rec are calculated using

- The transform coefficients of the motion compensated prediction block of the current block constructed using the previously decoded frames and the received motion vectors,
- Received quantized prediction error coefficients I.sub.err. Values S(x,y) can be further normalized and filtered. The reconstructed frame is then stored to be used for the prediction of future frames.

The invention is described in view of certain embodiments. Variations and modification are deemed to be within the spirit and scope of the invention. The changes required in H.26L Test Model in order to implement this embodiment of the present invention are also described.

SP-Picture Decoding:

The decoding of inter and copy coded blocks in SP-picture is described. Two different values of quantization parameter, denoted by QP1 and QP2, can be used during encoding/decoding of these blocks. Furthermore, values of QP1 and QP2 used for luma component can be different from those used for chroma component.

The values for inter and copy coded blocks are reconstructed as follows:

1. Form prediction P(x,y) of the current block using the received motion vectors and the reference frame. Calculate transform coefficients c.sub.pred for P(x,y). These coefficients can be calculated by performing forward transform on P(x,y).
2. Calculate reconstruction image coefficients $c.sub.rec = c.sub.pred + \text{alpha}(QP2) \times I.sub.err,$ where alpha(QP) is a parameter dependent QP value. Quantize c.sub.rec using quantization parameter QP=QP1. The quantized values will be referred to as quantized reconstructed image coefficients and denoted as I.sub.rec.

When implementing this step in "H.26L Test Model Long Term Number 6 (TML-6) draft0", document VCEG-L45, ITU-T Video Coding Experts Group Meeting, Eibsee, Germany, 09–12 Jan. 2001 to reduce computational complexity, calculation and quantization of c.sub.rec are combined:

$I.sub.rec = (c.sub.pred \times A(QP1) + I.sub.err \times F(QP1,QP2) + f \times 2^{20}) // 2^{20}$ where $F(QP1,QP2) = (2^{20} \times A(QP1) + 0.5 \times A(QP2)) // A(QP2)$, constant A( ) is defined earlier in the section on quantization, and f which was defined above as being in the range (−0.5 to +0.5).
3. Dequantize I.sub.rec using QP=QP1. The dequantized coefficients are equal to d.sub.rec.
4. Inverse transform is performed on d.sub.rec. The resulting values can be further normalized and filtered.

Another Embodiment for SP-Picture Decoding

The blocks with type inter and copy are reconstructed as follows:

1. Form prediction P(x,y) of current block using received motion vectors and the reference frame. Calculate transform coefficients c.sub.pred for P(x,y). These coefficients can be calculated by performing forward transform for P(x,y).
2. Quantize coefficients c.sub.pred using quantization parameter QP=QP1. The quantized values will be referred to as quantized prediction image coefficients and denoted as I.sub.pred. Calculate quantized reconstruction image coefficients I.sub.rec by adding I.sub.pred to the received quantized coefficients for the prediction error I.sub.err to, after a normalization, $I.sub.rec = I.sub.pred + (\text{beta}(QP2) \times I.sub.err + 0.5 \times \text{beta}(QP1)) // \text{beta}(QP1).$ where beta(QP) is a parameter dependent on method of quantization and the QP value. In case that the quantization in "H.26L Test Model Long Term Number 6 (TML-6) draft0", document VCEG-L45, ITU-T Video Coding Experts Group Meeting, Eibsee, Germany, 09–12 Jan. 2001, is used, the parameter beta( ) is given by beta(QP)=B(QP) where constant B( ) is defined earlier in the section on quantization.
3. Dequantize I.sub.rec using QP=QP1. The dequantized coefficients are equal to d.sub.rec.

Inverse transform is performed on d.sub.rec. The resulting values can be further normalized and filtered.

SP-Frame Encoding:

In the following, we describe the encoding of SP-frames for the decoder structure described as the preferred embodiment of the invention.

As can be observed from FIG. 5, there are two types of SP-frames, specifically, the SP-frames placed within the bitstream, e.g., S.sub.1 (513) and S.sub.2 (523) in FIG. 5, and the SP-frames (S.sub.12 in FIG. 5) that will be sent when there is a switch between bitstreams from bitstream 1 to bitstream 2). The encoding of S.sub.2 (523) and S.sub.12 (550) are such that their reconstructed frames are identical although they use different reference frames as described below.

When encoding an SP-picture placed within a bitstream (S.sub.1 (513) and S.sub.2 (523) in FIG. 5), the encoding of inter and copy coded blocks is performed as follows:

1. Calculate motion vectors using same method as for P-pictures. After motion compensation calculate transform coefficients for predicted block P(x,y) by performing forward transform and similarly calculate transform coefficients for the current block I(x,y). The transform coefficients for the current block are denoted as c.sub.orig and for the predicted image as c.sub.pred.
2. Transform coefficients for the predicted blocks are quantized using QP=QP1. The resulting levels after quantization are denoted as I.sub.pred.
3. The prediction error coefficients are obtained by $c.sub.err = c.sub.orig − I.sub.pred \times \text{alpha}(QP1)$ where alpha(QP) is a parameter dependent on method of quantization and used QP value.

When SP-frames are used in "H.26L Test Model Long Term Number 6 (TML-6) draft0", document VCEG-L45, ITU-T Video Coding Experts Group Meeting, Eibsee, Germany, 09–12 Jan. 2001

$\text{alpha}(QP) = (2^{20} + 0.5 \times A(QP)) // A(QP)$ where constant A(QP) is defined above in the section on quantization.
4. The prediction error coefficients are quantized using QP=QP2.

In the following we provide description of encoding of the second type of SP-frames which are used for example during bitstream switching. Consider the SP-picture, denoted as S.sub.12 in FIG. 5, that would be sent to switch from bitstream 1 to bitstream 2. The reconstructed values of this picture have to be identical to the reconstructed values of SP-picture in bitstream 2, denoted as S.sub.2 in FIG. 5, to which we are switching. The bitstream of the Intra macroblocks in frame S.sub.2 are copied to S.sub.12. The encoding of inter macroblocks is performed as follows:

1. Form the predicted frame for S.sub.12 by performing motion estimation with the reference frames being pictures preceding S.sub.1 in bitstream 1.
2. Calculate transform coefficients for predicted image by performing forward transform. The transform coefficients for the predicted image are denoted as c.sub.pred.
3. Quantize the obtained coefficients c.sub.pred using QP=QP1 and subtract the quantized coefficient levels I.sub.pred from the corresponding I.sub.rec of S.sub.2-picture. The resulting levels are the levels of the prediction error for S.sub.12 which will be transmitted to the decoder.

Another embodiment of the encoding of S.sub.12 is by setting the c.sub.pred equal to zero and then performing step 3 above.

Figure 6:
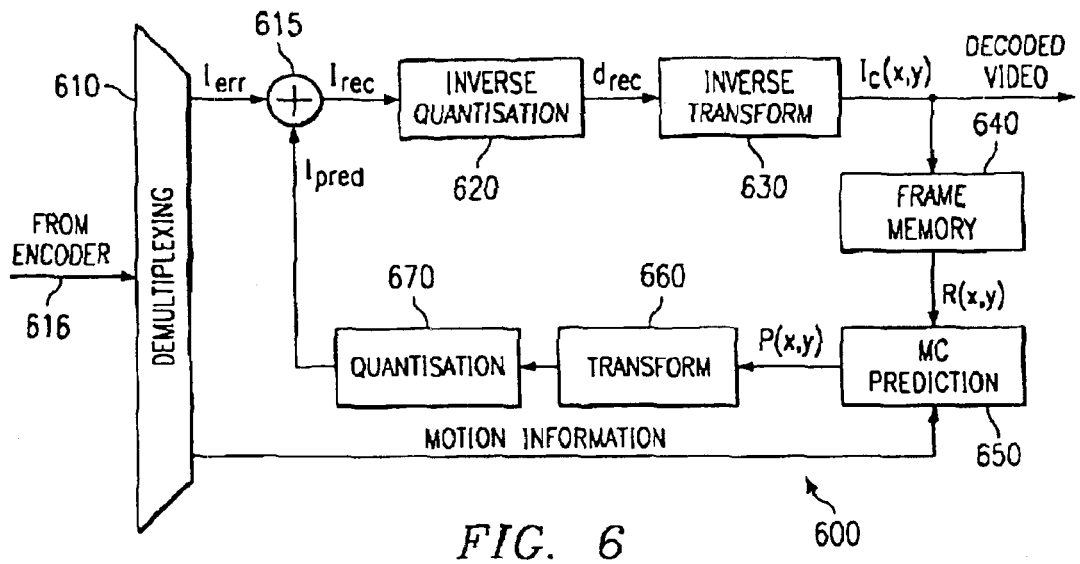
FIG. 6 is a block diagram of a decoder in accordance with an embodiment of the invention.

An embodiment of a decoder 600 in accordance with an embodiment of the invention is illustrated in FIG. 6. Referring to FIG. 6, decoder 600 comprises, inter alia, a demultiplexer 610, inverse quantization block 620, inverse transform block 630, frame memory 640, MC prediction block 650, tranform block 660, quantization block 670.

Figure 9:
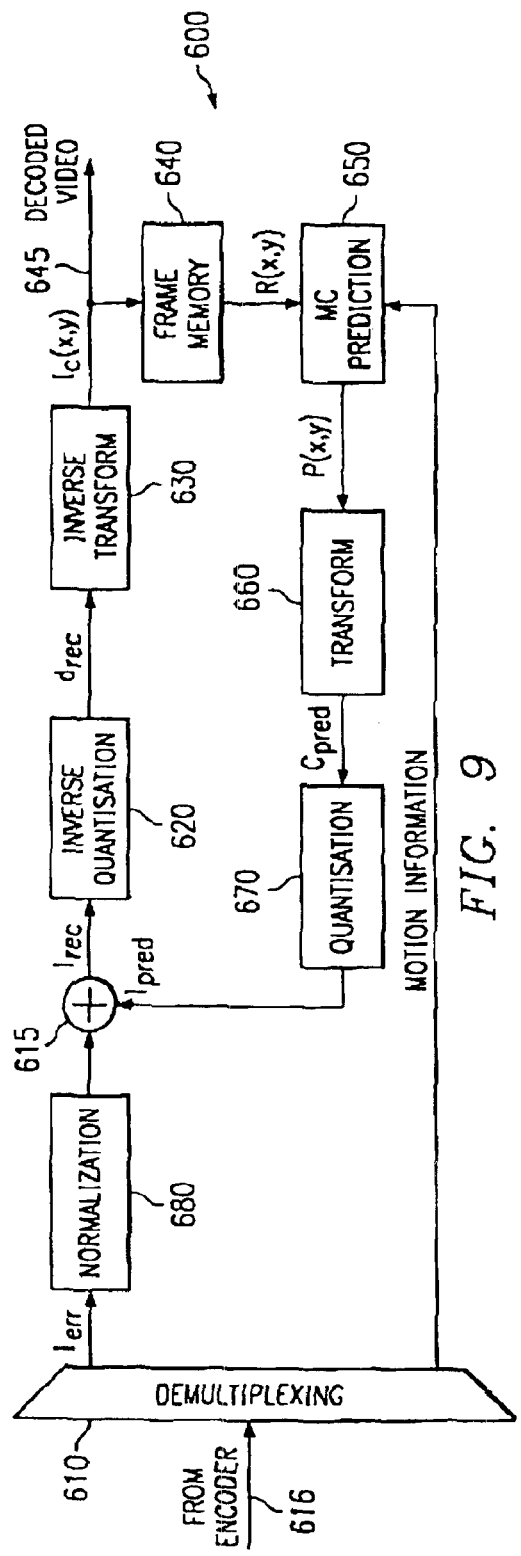
FIG. 9 is a block diagram of a decoder in accordance with another embodiment of the invention.
Figure 10:
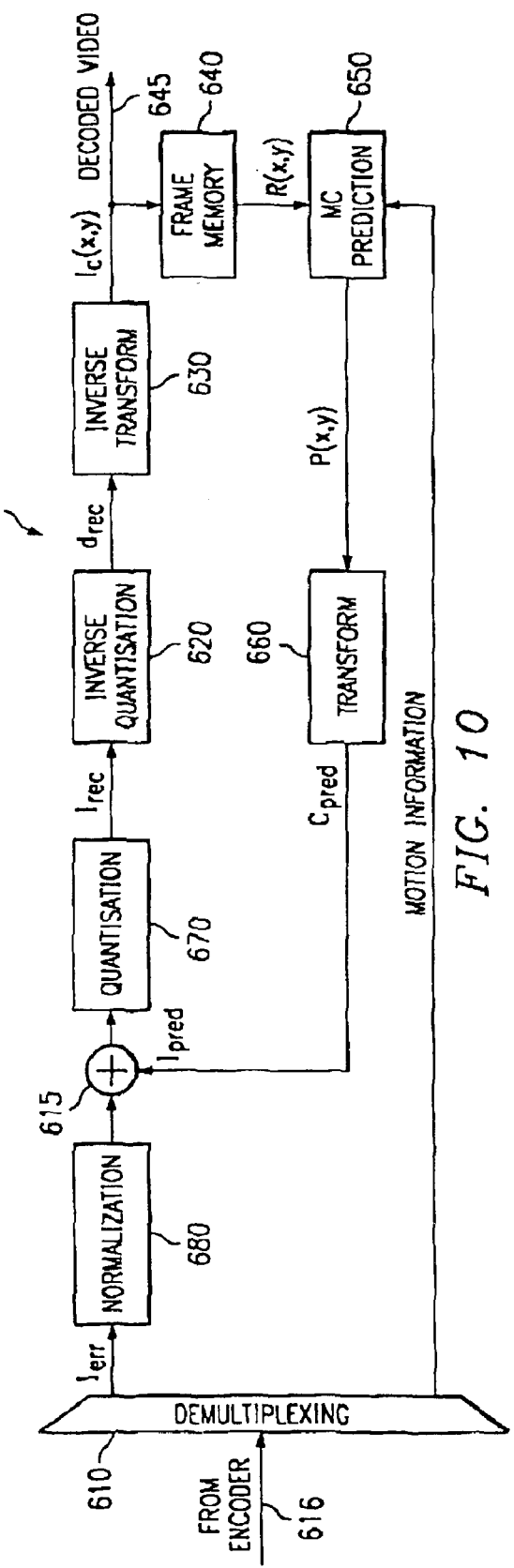
FIG. 10 is a block diagram of a decoder in accordance with yet another embodiment of the invention.

The invention is described in view of certain embodiments. Variations and modification are deemed to be within the spirit and scope of the invention. For instance, data from the demultiplexer may be normalized 680 before proceeding to adder and inverse quantization 620 as shown in FIG. 9. Alternatively, the quantisation block 670 may be connected to the adder 615 and the inverse quantisation block 620 as shown in FIG. 10.

It will be obvious to those skilled in the art after reading the specification including the appended claims that various changes in form and detail may be made therein without departing from the spirit and scope of the invention.

What is claimed is:

1. A decoder for decoding encoded data wherein identical frames may be obtained even when they are predicted using different reference frames, said decoder comprising: means for forming a prediction block P of a current block of data I using a plurality of motion vectors and a reference frame; means for calculating a plurality of transform coefficients c.sub.pred for said prediction block; means for calculating a plurality of quantized reconstruction coefficients I.sub.rec for said current block of data, wherein I.sub.rec=(c.sub.pred.times.A(QP1)+I.sub.err.times.F(QP1,QP2)+f.times.2.sup.20)//2.sup.20 where F(QP1,QP2)=(2.sup.20.times.A(QP1)+0.5.times.A(QP2))//A(QP2); means for dequantizing said plurality of quantized reconstruction image coefficients, creating a plurality of dequantized coefficients d.sub.rec; and means for inverse transforming said plurality of dequantized coefficients.

2. The decoder of claim 1 wherein means for calculating a plurality of quantized reconstruction coefficients I.sub.rec for said current block of data is comprised of: means for calculating reconstruction image coefficients c.sub.rec wherein c.sub.rec=c.sub.pred+alpha(QP2).times.I.su–b.err, wherein alpha(QP2) is a quantization parameter dependent on the method of quantization and used QP value; and means for quantizing said reconstruction coefficients creating a plurality of quantized reconstructed image coefficients I.sub.rec.

3. The decoder of claim 1 or 2, further comprising means for normalizing said plurality of inverse transformed dequantized coefficients.

4. The decoder of claim 3, further comprising means for filtering said plurality of normalized inverse transformed dequantized coefficients.

5. A method for decoding a frame of video data, comprising the steps of: forming a prediction of a current block of data using a plurality of motion vectors and a reference frame creating a predicted block; calculating a plurality of transform coefficients c.sub.pred from said predicted block; calculating a plurality of quantized reconstruction coefficients I.sub.rec for said current block of data using I.sub.rec=(c.sub.pred.times.A(QP1)+I.sub.err.times.F(QP1,QP2)+f.times.220-)//2.sup20, wherein F(QP1,QP2)=(2.sup.20.times.A(QP1)+0.5.times.A(QP2))//-A(QP2); dequantizing said plurality of quantized reconstruction image coefficients, creating a plurality of dequantized coefficients d.sub.rec; and inverse transforming said plurality of dequantized coefficients.

6. A method for decoding a frame of video data, comprising the steps of: forming a prediction of a current block of data using a plurality of motion vectors and a reference frame creating a predicted block; calculating a plurality of transform coefficients c.sub.pred from said predicted block; calculating reconstruction image coefficients c.sub.rec wherein c.sub.rec=c.sub.pred+.alpha(QP2).times.I.sub.err, wherein alpha(QP2) is a quantization parameter dependent on the method of quantization and used QP value; and quantizing said reconstruction coefficients creating a plurality of quantized reconstructed image coefficients I.sub.rec; dequantizing said plurality of quantized reconstruction image coefficients, creating a plurality of dequantized coefficients d.sub.rec; end inverse transforming said plurality of dequantized coefficients.

7. The methods of claim 5 or 6, further comprising the step of normalizing said plurality of inverse transformed dequantized coefficients.

8. The method of claim 7, further comprising the step of filtering said plurality of normalized inverse transformed dequantized coefficients.

9. An encoder for encoding a frame of video data, comprising the steps of; means for forming a prediction of a current block of data using a plurality of motion vectors and a reference frame; means for calculating a plurality of transform coefficients c.sub.orig for said current block of data corresponding to a set of basis functions; means for calculating a plurality of transform coefficients c.sub.pred for said predicted block; means for quantizing said predicted block coefficients using quantization parameter QP=QP1 creating a plurality of quantized prediction image coefficients; I.sub.pred. means for calculating the prediction error coefficients using c.sub.err=c.sub.orig-I.sub.pred.times..alpha(QP1) wherein alpha(QP1)=(2.sup.20+0.5.times.A(QP1))//A(QP1); and means for quantizing said prediction error coefficients.

10. A method for encoding a frame of video data, comprising the steps of: forming a prediction of a current block of data using a plurality of motion vectors and a reference frame; means for calculating a plurality of transform coefficients c.sub.orig for said current block of data corresponding to a set of basis functions; calculating a plurality of transform coefficients c.sub.pred for said predicted block; quantizing said predicted block coefficients using quantization parameter QP=QP1 creating a plurality of quantized prediction image coefficients $I_{pred}$; calculating the prediction error coefficients using: $c_{err} = c_{origI_{pred}} \times alpha(QP1)$; wherein alpha $(QP1) = (220 + 0.5 \times A(QP1))//A(QP1)$; and quantizing said prediction error coefficients.

11. A method of reconstructing blocks of encoded data comprising the steps of: forming a prediction $P(x,y)$ of a current block using a plurality of received motion vectors and a reference frame; performing a forward transform on $P(x,y)$ to obtain a set of transform coefficients $c_{pred}$ for $P(x,y)$; quantizing said set of transform coefficients $c_{pred}$, resulting in quantized prediction image coefficients $I_{pred}$. adding said received quantized coefficients for the prediction error $I_{err}$ to $I_{pred}$ resulting in quantized reconstruction image coefficients $I_{rec}$ using: $I_{rec} = I_{pred} + (beta(QP2) \times I_{err} + 0.5 \times beta(QP1))//beta(QP1)$. wherein $beta(QP)$ is a parameter dependent on method of quantization and used QP value; dequantizing $I_{rec}$ resulting in dequantized coefficients $d_{rec}$; and performing inverse transform for $d_{rec}$.

12. The method of claim 11, further comprising the step of normalizing said plurality of inverse transformed dequantized coefficients.

13. The method of claim 12, further comprising the step of filtering said plurality of normalized inverse transformed dequantized coefficients.

* * * * *